(12) United States Patent
Misaji et al.

(10) Patent No.: US 6,685,250 B2
(45) Date of Patent: Feb. 3, 2004

(54) NOISE INSULATION STRUCTURE

(75) Inventors: Kazuhito Misaji, Wako (JP); Tsuyoshi Yamashita, Wako (JP); Yoshihiro Noguchi, Wako (JP); Tetsuya Imai, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/261,384

(22) Filed: Sep. 30, 2002

(65) Prior Publication Data

US 2003/0062744 A1 Apr. 3, 2003

(30) Foreign Application Priority Data

Oct. 2, 2001 (JP) ........................................ 2001-306010

(51) Int. Cl.7 ............................................... B62D 33/00
(52) U.S. Cl. ................................ 296/39.3; 296/193.07; 181/290
(58) Field of Search ...................... 296/39.3, 193.07; 181/204, 290; 428/77, 95

(56) References Cited

U.S. PATENT DOCUMENTS

| | | | | | |
|---|---|---|---|---|---|
| 5,266,374 A | * | 11/1993 | Ogata | ........................... | 428/77 |
| 5,504,282 A | * | 4/1996 | Pizzirusso et al. | .......... | 181/290 |
| 5,554,830 A | * | 9/1996 | Muller et al. | ............... | 181/290 |
| 6,102,465 A | * | 8/2000 | Nemoto et al. | ............ | 296/39.3 |

FOREIGN PATENT DOCUMENTS

| | | |
|---|---|---|
| JP | 6-2988 | 1/1994 |
| JP | 7-81007 | * 3/1995 |
| JP | 9-95168 | * 4/1997 |

* cited by examiner

Primary Examiner—Joseph D. Pape
(74) Attorney, Agent, or Firm—Merchant & Gould, P.C.

(57) ABSTRACT

A vehicle floor structure having a noise insulation structure with a two-way freedom system is provided. The two-way freedom system noise insulation structure is comprised of a lower mass layer and a urethane layer beneath the same, and an upper mass layer and a low resilient material layer beneath the same and made of fibrous material layer or low resilient urethane layer.

5 Claims, 4 Drawing Sheets

NOISE INSULATION STRUCTURE

FIELD OF THE INVENTION

The present invention relates to an improvement in a noise insulation structure for a vehicle floor section.

BACKGROUND OF THE INVENTION

Noises reflected from road surfaces and noises radiated from an exhaust system are transmitted through a steel floor panel into a vehicle compartment. It is desirable that such transmission noises are as small as possible for comfort of a vehicle occupant. To this end, various attempts have heretofore been made in the past to take a variety of noise insulation measures for a floor-placed carpet (see Japanese Patent Publication No. 6-2988).

FIGS. 3A to 3C hereof illustrates a prior art noise insulation structure for a vehicle floor section.

FIG. 3A shows a schematic view of a vehicle body 101 of a vehicle, and a noise insulation structure embodied on a floor section b of the vehicle body 101 is described in detail below with reference to FIG. 3B.

In FIG. 3B, the prior art noise insulation structure for the vehicle section is comprised of a urethane layer 103 placed over a vehicle floor panel 102 made of steel, and a carpet 105 is placed over the urethane layer 103 via a mass layer 104.

FIG. 3C is a resilient modeling representation of the prior art noise insulation structure and shows the noise insulation structure of a one-way freedom system assuming that, in FIG. 3B, the mass layer 104 has a mass of m1 and the urethane layer 103 beneath the mass layer is made of a spring with a spring constant of k1. The noise insulation characteristic of the noise insulation structure of such a one-way freedom system is described below with reference to a subsequent figure.

FIG. 4 is a noise insulation performance curve of the prior art noise insulation structure, with the horizontal axis and the vertical axis indicating a frequency and a transmission loss, respectively. It appears that the larger the transmission loss, the higher will be the noise insulating performance.

A symbol f1 in the horizontal axis designates a primary resonance point and, in a high frequency range beyond the primary resonance point f1, the transmission loss increases at a gradient of 12 dB per one octave.

In the meantime, although the prior art structure forms the noise insulation structure of the one-way freedom system and a noise insulation effect of 12 dB per one octave can be expected, it is required for the vehicle to have a further increased noise insulation performance to effectively alleviate load noises arising from the rough road surface during a travel of the vehicle. Namely, the load noises arising from the rough road surfaces during the travel of the vehicle are transmitted through the floor section of the vehicle to reach the vehicle compartment and, so, it is highly required for the vehicle to undertake the load noise measure to provide a further improvement over the noise insulation structure of the vehicle floor section to obtain an increased noise insulation performance.

SUMMARY OF THE INVENTION

According to the present invention, there is provided a noise insulation structure, for a vehicle floor section, which comprises a floor panel made of steel, a urethane layer placed over the floor panel, a lower mass layer placed over the urethane layer, a low resilient material layer placed over the lower mass layer, an upper mass layer placed over the low resilient material layer, and a carpet placed over the upper mass layer.

The lower mass layer and the urethane layer beneath the same, and the upper mass layer and the low resilient material layer beneath the same establish a noise insulation structure of a two-way freedom system. Such a configuration enables an increased noise insulation performance of even 24 dB per one octave to be obtained. However, the mere presence of the noise insulation structure of the two-way freedom system suffers from a remarkable drop in the noise insulation performance especially at a secondary resonance frequency. For such measures, a low resilient material layer with a resilient rate lower than that of urethane is adopted to lower the secondary resonance frequency while locating urethane with a high adhesion property on the floor panel to cause an air gap to be dispensed with to preclude noise from being leaked. This results in a capability of exhibiting a high noise insulation performance of 24 dB per one octave in a range starting from a further low frequency area. As a result, the load noises arising from the rough road surfaces can be effectively attenuated to enable the vehicle to be provided with a further comfortable vehicle compartment.

The low resilient material layer set forth above may be comprised of, for instance, according to an example of an embodiment, a layer composed of fibrous material, a low resilient urethane layer and a hard felt layer.

The above urethane layer may be preferably formed with a concave portion so as to open upward in which the above lower mass layer and the above low resilient material layer are fitted whereupon the carpet is adhered thereto. With such a configuration, adhesion between the upper layer portion and the lower layer portion may be dispensed with, resulting in a capability of avoiding reduction in noise insulation performance as well as increase in cost-up factors.

BRIEF DESCRIPTION OF THE DRAWINGS

The present invention will be described in detail below, by way of example only, with reference to the accompanying drawings, in which.

DETAILED DESCRIPTION OF THE PREFERRED EMBODIMENTS

The following description is merely exemplary in nature and is in no way intended to limit the invention, its application or uses.

Figure 1A:
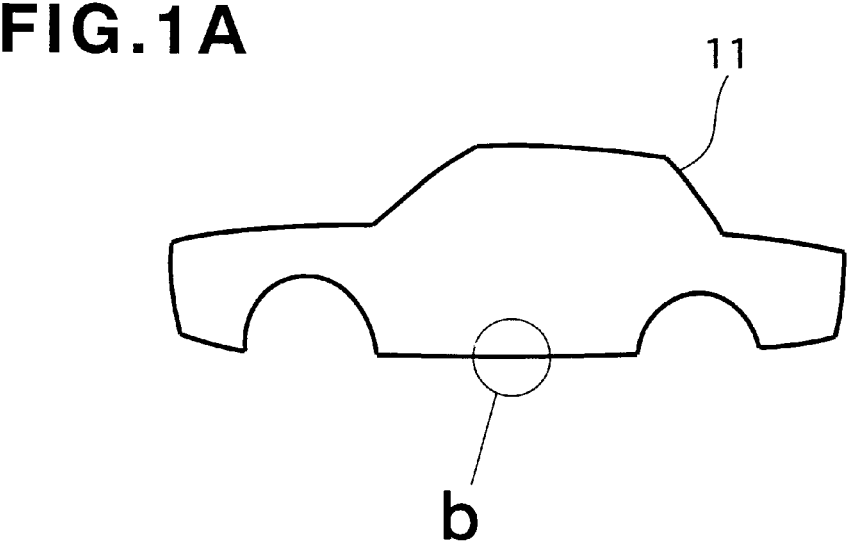
FIGS. 1A to 1C are schematic views illustrating a noise insulation structure for a vehicle floor section of an embodiment according to the present invention, FIG. 1B being an enlarged cross sectional view of a portion b of FIG. 1A, and FIG. 1C being an elastic modeling representation of FIG. 1B.

Referring to FIG. 1A, a vehicle body 11 has a floor b with a noise insulation structure.

Figure 1B:
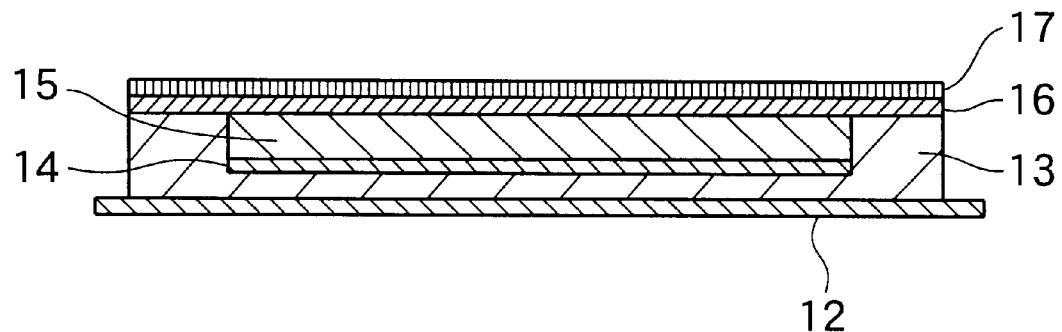

As shown in FIG. 1B, the noise insulation structure according to the present invention includes a floor plate 12 made of steel, on which a urethane layer 13, having an adhesive property with respect to the floor plate 12, is placed, whereupon a fibrous layer 15, made of fibrous material having a lower Structure Youngs Modulus than that of urethane, is placed on the urethane layer 13 via a lower mass layer 14 and a carpet 17 is placed on the fibrous layer 15 via an upper mass layer 16.

That is, placing the urethane layer 13, having the high adhesive property, on the floor plate 12 prevents a gap from being formed to preclude noise from being leaked. In particular, the urethane layer 13 is formed with a concave portion 13a, into which the lower mass layer 14 and the fibrous layer 15 are placed whereupon the carpet 17 is adhered via the upper mass layer 16. The lower mass layer 14 and the felt 15 are disposed in the urethane layer 13 without the use of an adhesive. The presence of adhesive weakens a noise insulation effect and, so, it may be preferable not to use the adhesive. Consequently, it is desirable to utilize the concave portion 13a, to which the associated components are fitted, to prevent the use of adhesive as in the presently filed embodiment.

Figure 1C:
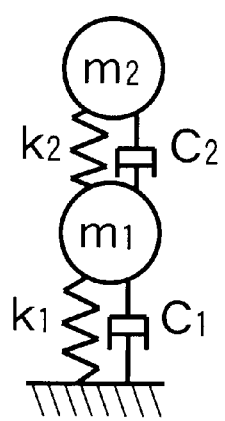

FIG. 1C is an elastic modeling representation of the noise insulation structure according to the present invention and shows the noise insulation structure in a two-way freedom system assuming that the lower mass layer 14 of FIG. 1B has a mass of m1, the urethane layer 13, beneath the lower mass layer 14, serves as a spring with a spring constant of k1, the upper mass layer 16 has a mass of m2 and the fibrous layer 15, beneath the upper mass layer 16, serves as a spring with a spring constant of k2. The noise insulation characteristic of the noise insulation structure of the two-way system is described below with reference to the subsequent figures.

Figure 2:
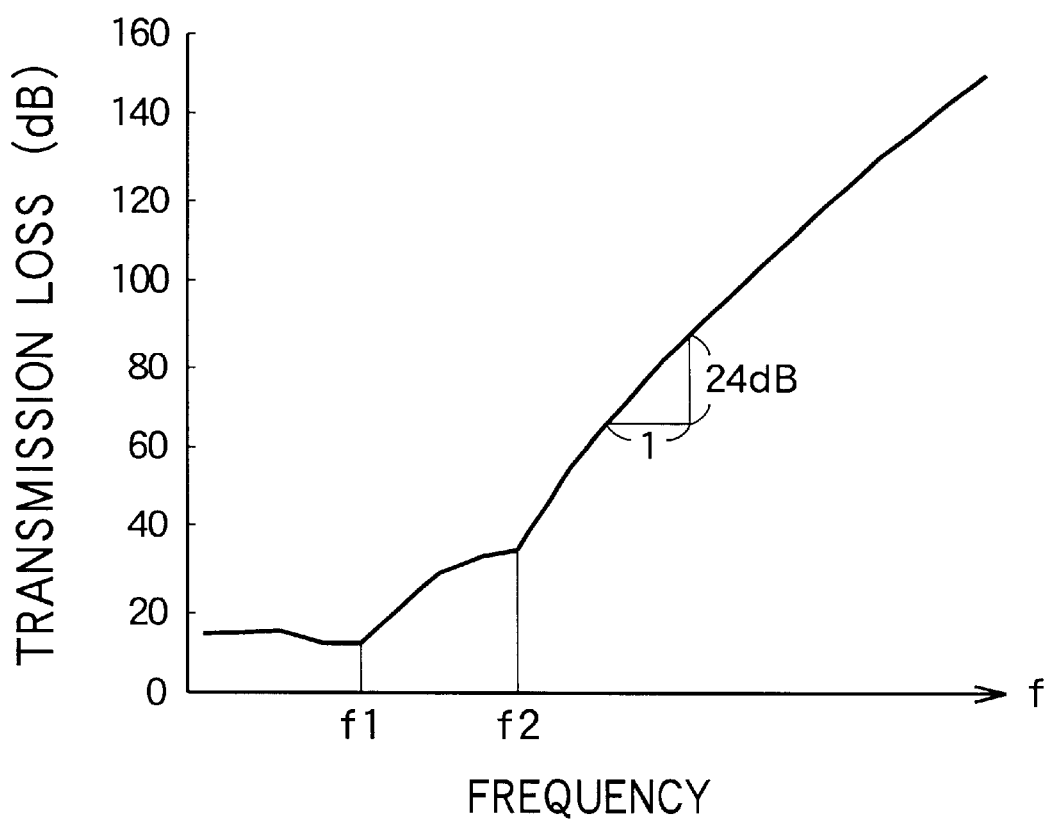
FIG. 2 is a graph showing a noise insulation performance curve obtained with the noise insulation structure of a two-way freedom system according to the present invention.
Figure 3A:
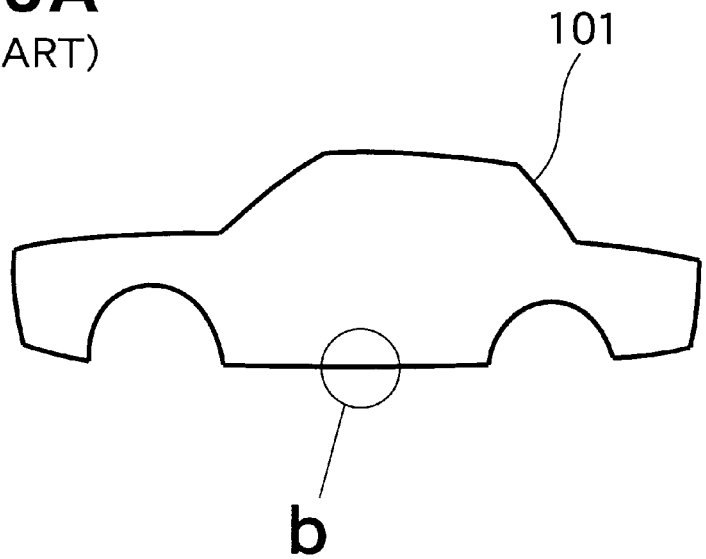
FIGS. 3A to 3C are schematic views showing a conventional noise insulation structure for a vehicle floor section, FIG. 3B being an enlarged cross sectional view of a portion b of FIG. 3A, and FIG. 3C being a resilient modeling representation of FIG. 3B.
Figure 3B:
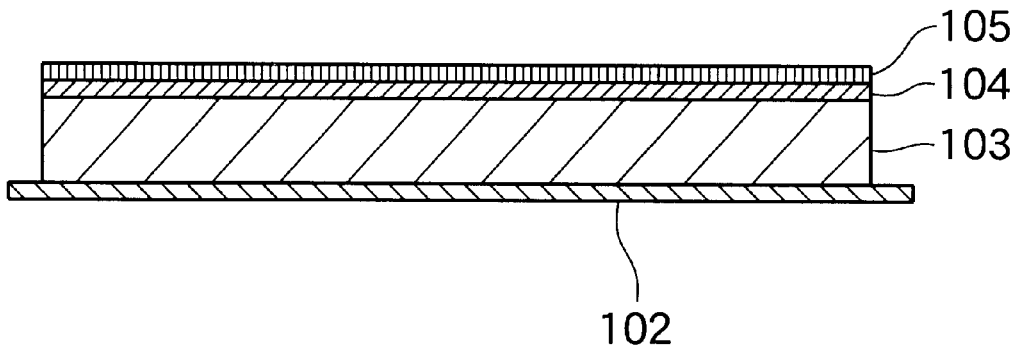
Figure 3C:
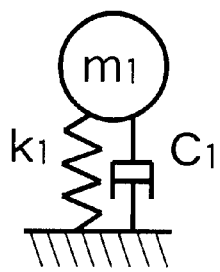

FIG. 2 is a noise insulating performance curve of the vehicle structure according to the present invention, with the horizontal axis and the vertical axis indicating a frequency and a transmission loss, respectively.

Figure 4:
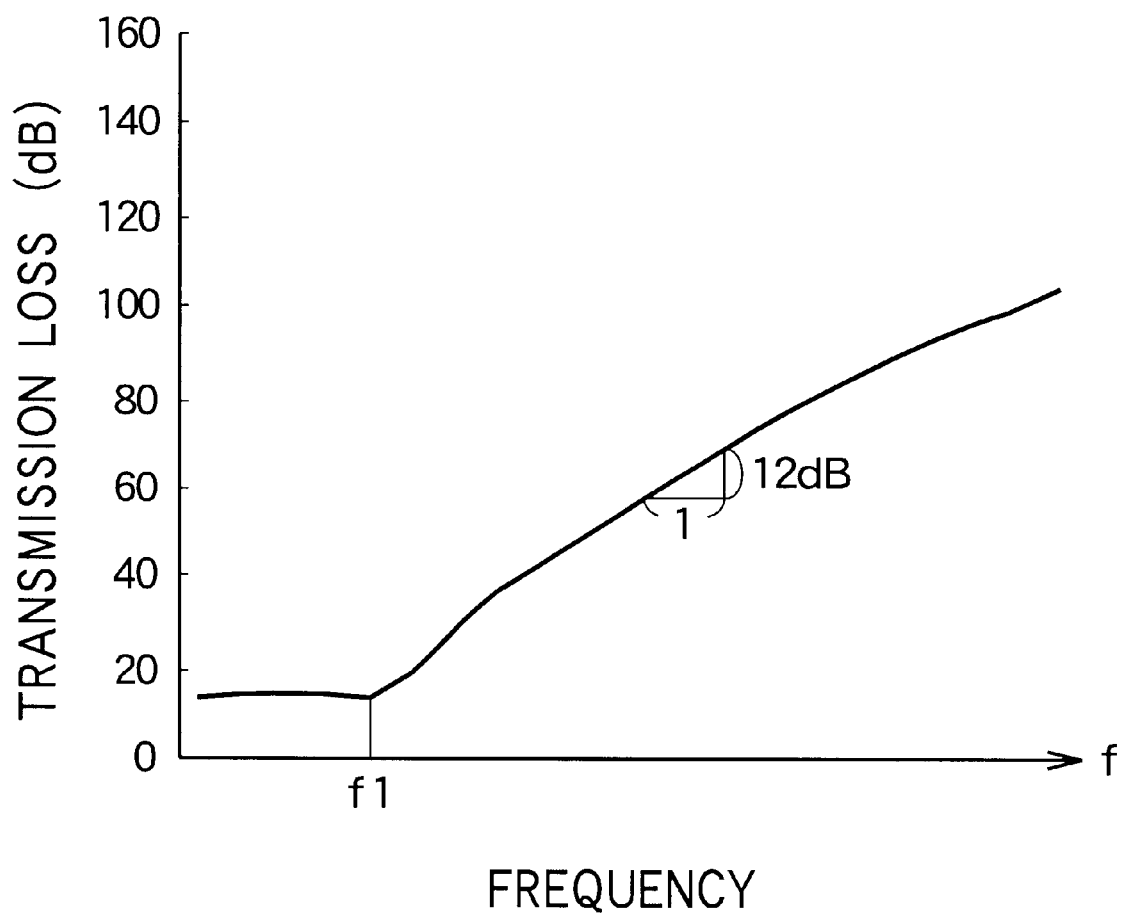
FIG. 4 is a graph showing a noise insulation performance curve of the conventional noise insulation structure of the one-way freedom system of the prior art.

A symbol f1 designates a primary resonance point and a symbol f2 designates a secondary resonance point, with the transmission loss increasing at a gradient of 24 dB per one octave in a frequency range higher than the secondary resonance point f2. That is, while in a region beyond the secondary resonance point of f2 on the horizontal axis, it is expected for the prior art structure to have the noise insulation effect of 12 dB per one octave (see FIG. 4), the noise insulation effect of 24 dB per one octave may be expected with the present invention to provide a remarkable improvement over the noise insulation performance.

In general, the noise insulation structure of the two-way freedom system, it is known that the noise insulation performance is remarkably lowered especially at the secondary resonance point of f2 due to a resonance effect. To alleviate such a phenomenon to a minimum limit, various trials have been conducted in the present invention to lower the secondary resonance point.

More particularly, the present invention contemplates the provision of the spring constant k2 made of resilient material, such as fibrous material, low urethane, hard felt and other low resilient material, which serves as means for lowering the secondary resonance point of $f2=(k2/m2)^{0.5}$. In addition, the presence of urethane used in a manner set forth above allows the air gap from being formed to preclude the noise from being leaked outside.

With the structure of the present invention, accordingly, it was successful to lower the secondary resonance frequency to achieve the noise insulation effect at the gradient of even 24 db per one octave in a range starting from the low frequency area.

That is, as a result of permitting the secondary resonance point of f2 to be closer to the low frequency range in a manner as shown in FIG. 2 while minimizing a drop in the transmission loss at the secondary resonance point of f2, it was enabled to achieve the noise insulating effect of even 24 dB per one octave in the value starting from the low frequency range.

It doesn't matter whether the fibrous layer 15 is made of any material, provided that it is composed of resilient material with a lower resilience than usual urethane, such as low resilient urethane and hard felt.

The present disclosure relates to the subject matter of Japanese Patent Application No. 2001-306010, filed Oct. 2, 2001, the disclosure of which is expressly incorporated herein by reference in its entirety.

What is claimed is:

1. A noise insulation structure for a vehicle floor section, comprising:

a floor panel made of steel;

a urethane layer disposed on the floor panel;

a lower mass layer disposed on the urethane layer;

a low resilient material layer disposed on the lower mass layer;

an upper mass layer disposed on the low resilient material layer; and a carpet disposed on the upper mass layer.

2. A noise insulation structure according to claim 1, wherein the low resilient material layer includes a layer made of fibrous material.

3. A noise insulation structure according to claim 1, wherein the low resilient material layer is made of low resilient urethane.

4. A noise insulation structure according to claim 1, wherein the low resilient material layer is made of hard felt.

5. A noise insulation structure according to claim 1, wherein the urethane layer is formed with a concave portion which opens upward, and to which the lower mass layer and the low resilient material layer are fitted.

* * * * *